United States Patent [19]

Ishida et al.

[11] Patent Number: 4,861,383

[45] Date of Patent: Aug. 29, 1989

[54] PROCESS FOR RECOVERING SUBTERRANEAN STEM STARCH AND PROTEIN

[75] Inventors: Masahiko Ishida; Ryooichi Haga; Yoji Odawara; Sankichi Takahashi, all of Hitachi; Katsuya Ebara, Mito, all of Japan

[73] Assignee: Hitachi, Ltd., Tokyo, Japan

[21] Appl. No.: 102,346

[22] Filed: Sep. 29, 1987

Related U.S. Application Data

[63] Continuation of Ser. No. 706,949, Feb. 28, 1985, abandoned.

[30] Foreign Application Priority Data

Mar. 2, 1984 [JP] Japan .................................. 59-38580

[51] Int. Cl.$^4$ ...................... C08B 30/02; C08B 30/04; A23L 1/195
[52] U.S. Cl. ........................................ 127/67; 127/65; 127/66; 127/69; 426/269; 426/637; 426/661; 426/489; 426/330.5; 426/321; 530/370; 530/420; 530/418; 530/415; 585/733
[58] Field of Search ...................... 127/67, 66, 71, 69, 127/65; 426/321, 330.5, 269, 637, 661, 489; 530/370, 420, 446, 415

[56] References Cited

U.S. PATENT DOCUMENTS

| | | | |
|---|---|---|---|
| 2,413,129 | 12/1946 | Wilson | 426/269 X |
| 2,890,120 | 6/1959 | Makower | 426/269 |
| 3,890,888 | 6/1975 | Verberne | 426/489 X |
| 4,007,286 | 2/1977 | Ooraikul | 426/637 X |
| 4,110,320 | 8/1978 | von der Haar | 530/415 |
| 4,421,682 | 12/1983 | Edwards et al. | 530/418 |

FOREIGN PATENT DOCUMENTS

| | | |
|---|---|---|
| 2637810 | 2/1978 | Fed. Rep. of Germany ...... 426/489 |
| 2256727 | 1/1975 | France . |
| 62269 | 1/1948 | Netherlands . |

*Primary Examiner*—H. M. S. Sneed
*Assistant Examiner*—Chung K. Pak
*Attorney, Agent, or Firm*—Antonelli, Terry & Wands

[57] ABSTRACT

This invention provides a process for easily recovering nearly white starch and protein having a high commercial value by depressing darkening of crushed slurry and juice in producing starch and protein of a subterranean stem.

The above-mentioned process is characterized by adding at least one member selected from the group consisting of sodium thiosulfate, potassium thiosulfate, sodium hydrogen sulfite, sodium sulfite and potassium sulfite at the time of crushing the subterranean stem.

6 Claims, No Drawings

PROCESS FOR RECOVERING SUBTERRANEAN STEM STARCH AND PROTEIN

This application is a continuation application of application Ser. No. 706,949, filed Feb. 28, 1985, abandoned.

BACKGROUND OF THE INVENTION

This invention relates to a process for recovering starch and protein of high quality from a subterranean stem.

Subterranean stem starch is produced by crushing a subterranean stem of potato including sweet potato, or the like, separating starch granules in its cells therefrom, and then purifying the same by washing with water. In general, about 20% by weight or less of the raw subterranean stem is recovered as starch, and the residue, i.e., about 80% or more thereof is discharged as juice and fiberous residue (pulp). Recently, there are not a few factories having a processing capacity of 1,000 tons per day, and the amount of wastes produced in these large-scale factories is huge. In particular, the juice is a concentrated waste solution having an organic substance concentration of 2 to 5% including protein, and in the case of potato, protein is contained in the juice in an amount of about 2% of the organic substances.

Attempts to recover the protein in the juice have also been made. According to our research, the most suitable method is heat treatment of the waste assumed to be caused by actions of a group of enzymes which function as catalysts for polymerization reactions of low-molecular-weight aromatic compounds, namely, tyrosinase, catecholase, phenolase and polyphenol oxidase, but the reaction mechanism at the time of such crushing of the subterranean stem is not yet apparent. For these reasons, it becomes necessary for recovery of starch having a high whiteness to carefully remove the darkened juice and colored precipitate (low grade starch precipitate) other than starch by washing. Needless to say, the juice freed from pulp is also darkened and when it is heated to agglomerate protein, it becomes a dark grayish black floc, so that no white protein can be obtained. The color cannot be removed even by repeated washing and reprecipitation of these precipitates. Therefore, only low-grade protein having limited application can be obtained even by achieving such recovery.

Japanese Patent Appln. Kokai (Laid-Open) No. 63200/76 (a process for producing water-soluble starch from potato juice) discloses that uncolored protein can be obtained by subjecting potato juice to ultrafiltration and then drying the concentrate thus obtained at a temperature at which the protein is not denatured. However, according to our study, a crushed potato slurry was colored in several seconds to tens of seconds and starch and protein separated from the colored slurry had already been colored, so that no uncolored protein, in particular, could be obtained. Since the amount of potato slurry is very large in a practical potato starch-manufacturing plant, it is very difficult to separate and recover protein by the heat treatment described above before the protein is colored.

The above patent appln Kokai discloses that potato juice is heated (50° to 60° C.) in a short time by steam injection to inactivate the enzymes or precipitate the colored substance. However, since a potato slurry is colored in a very short time as described above, it is difficult in practice to heat potato juice to 50° to 60° C. before coloring of a large amount of the slurry.

SUMMARY OF THE INVENTION

The object of this invention is to provide a process for easily recovering protein which is whitish having a high commercial value, by preventing the crushed slurry and the juice from being blackened in producing starch and protein of a subterranean stem.

The first feature of this invention is recovery of starch and protein from a slurry prepared by crushing a subterranean stem in the presence of at least one member selected from the group consisting of alkali thiosulfate, alkali sulfite and alkali hydrogen sulfite.

The present inventors have confirmed by many experiments that a crushed slurry or a juice freed from pulp which has already been begun to be darkened is difficult to prevent from being further darkened. Accordingly, the present inventors have devoted themselves to research on a method for preventing the darkening at the time of crushing a subterranean stem. As a result, it has been found that the darkening can be prevented very effectively when the crushing is conducted in the presence of a slight amount of at least one member selected from sodium thiosulfate, potassium thiosulfate, sodium sulfite, potassium sulfite and sodium hydrogen sulfite.

On the other hand, there were tested various additions of cysteine monohydrochloride, ascorbic acid or ascorbate which are used as an antioxidant, or mercaptoethanol, sodium borohydride which are a relatively strong reducing agent, etc., but they were not or very slightly effective. Potassium hydrogen sulfite was also only slightly effective. From this fact, thiosulfuric acid ions, hydrogen sulfurous acid ions and sulfurous acid ions seem to be bound selectively to polymerases to inhibit their activities.

The above-mentioned additives can uniformly be dispersed when added in the form of an aqueous solution.

Although the effective concentration of the additives varies depending on the kind of the additives as well as the kind of subterranean stem, timing of storage, etc., it ranges from 1 to 0.001% on wet-subterranean stem base. When the concentration is less than 0.001%, the effect is incomplete. When it exceeds 1%, deposition of protein and the like becomes liable to be caused owing to the change in pH of the slurry, therefore such a concentration is not suitable.

Now, since the protein-removed juice is still a liquid having a high BOD, methane fermentation is suitable for treating the waste solution. Therefore, when the concentration of the additives exceeds 1%, the methane fermentation activity in the protein-removed juice is depressed, and the concentration of hydrogen sulfide gas in the fermentation gas is increased, so that the removal of hydrogen sulfide is a burden in utilizing the gas. In consideration of the factors described above, more suitable concentration is 0.1 to 0.005%. A slurry which undergoes no color change is obtained by crushing a subterranean stem by the abovementioned method, and the darkening can effectively be prevented even when steps of separation of pulp, recovery of starch from juice, and the like are subsequently carried out. Accordingly, whitish protein can be agglomerated and deposited by heat-treating the juice. As conditions of the heat treatment, 55° to 85° C. for 0.5 to 100 minutes are suitable. Needless to say, as a method for recovering protein, there can be employed not only agglomeration by heating but also heretofore well-known methods, which include, for example, molecular sieving represented by molecular sieve membrane.

With the progress of darkening of juice, a small amount of a gel-like precipitate is formed. Therefore, when molecular sieving is applied to a juice prepared by crushing by a conventional method, the precipitate adheres to the membrane surface to decrease the treating efficiency greatly. However, in the case of the juice according to this invention which is not darkened, such a trouble can be limited to the minimum even in molecular sieving.

On the other hand, this invention is convenient not only for obtaining protein but also for obtaining purified starch from crude starch. In the case of the conventional methods, it is necessary to carefully carry out a procedure of removing a dark juice and a dark-brown gel-like precipitate (low grade starch precipitate) which are adhering to crude starch from the starch granules by washing with water, but when the crushing method of this invention is employed, the washing step becomes less troublesome.

The second feature of this invention is that the waste solution can easily be treated by methane fermentation. In methane fermentation, the fermenting ability is influenced by the nitrogen content of substrate. The C/N ratio is preferably about 25, and when it is 5 or less, the amount of methane produced decreases by about 20 to 30%.

Since the juice contains 40 to 50% (dry base) of protein in addition to soluble sugars, its nitrogen content is high and hence the C/N ratio is around 5. Therefore, by virtue of removing protein, the C/N ratio becomes about 15 which is a value suitable for methane fermentation, so that the fermentation becomes easier to cause. When the pulp is added to the protein-removed juice, the C/N ratio is further improved to become very favorable. When agglomeration by heating is employed as a method for separating protein, it becomes possible to adjust the fermentation temperature to a temperature suitable for methane fermentation (35° to 60° C.) by mixing the protein-removed juice with the pulp. Further, a methane-containing gas produced by the methane fermentation can be used as a fuel for heating a fermentor, drying starch or protein, and the like.

In the above-mentioned amount to be added, the chemical agents as described above have no adverse effect on the qualities of not only the recovered starch but also the recovered protein.

DETAILED DESCRIPTION OF PREFERRED EMBODIMENT

This invention is further explained below in more detail with reference to Examples, Comparative Examples and Experimental Examples.

EXAMPLE 1

To about 1 kg of potato (solid content: 25 wt %, in which 22% was accounted for by organic substances) was added 50 mg of sodium thiosulfate pentahydrate, and the potato was crushed to a grain size of 1 mm or less by means of a motor-driven mixer to obtain about 1 kg of a crushed slurry. No darkening discoloration occurred in the crushing procedure and the slurry assumed a light yellowish white color. The aforesaid crushed slurry was filtered by means of a centrifugal extractor to obtain 660 g of a light-yellow starch-containing juice (a) and 350 g of light-yellowish-brown crude pulp (b). The aforesaid starch-containing juice was centrifuged to separate white starch granules, whereby 610 g of a light-yellow juice (solid content: 4.1%, in which 3.1% was accounted for by organic substances) was obtained. Next, 1 kg of water was added to the aforesaid pulp to prepare a slurry, which was then sieved by use of a 40-mesh screen to wash out starch granules, and the residue was filtered by means of a centrifugal filter and then compressed to obtain 128 g of washed and compressed pulp (solid content: 25.3%, in which 24.1% was accounted for by organic substances).

On the other hand, a washing procedure comprising adding, to the starch granules separated from the aforesaid juice, water 10 times volume as much as these starch granules and allowing the resulting mixture to stand to precipitate and separate the starch granules was repeated twice, and the thus separated starch and the starch recovered from the pulp were combined and then compressed. The thus dehydrated starch was dried by air stream at 70° C. to obtain 180 g (water content: 18%) of dry starch (c) which was pure-white and had slightly starchy odor.

In an 1-liter stainless steel beaker was placed 610 g of the starch-removed juice (d) freed from starch by the procedures described above, and heated in a water bath at 80° C. for 2 minutes. By the above-mentioned heat treatment, a palely cream-colored protein precipitate was formed. The precipitate was centrifuged to obtain 584 g of a protein-removed juice (f). On the other hand, 80 ml of water was added to the protein precipitated by the centrifugation to suspend the protein, after which centrifugation was conducted again to recover a protein precipitate. This protein precipitate was spread into a thin film and dried. The dried protein was crushed in a mortar to obtain 6.6 g (protein content: 70%) of dry powdered protein (e) which was whitish having a slight potato odor.

Next, 292 g of the aforesaid protein-removed juice (f) and 64 g of the crude pulp (b) were mixed and then poured into a fermentor made of acrylic resin which had an effective volume of 2 liters and contained 1.5 kg of a seed culture slurry. Subsequently, the mixture was fermented with batchwise under an anaerobic condition (one phase digestion) at a fermentation temperature of 60° C. and a stirring rate of 100 r.p.m. (As the seed culture slurry, there was used a fermented slurry prepared by repeating culture for an acclimatization twice by batchwise fermentation by using a starting slurry separately prepared by the same procedure as described above, except that no sodium thiosulfate was added at the time of crushing the subterranean stem.) The fermentation came to an end on the third day, and the methane yield (h) reached 340 liters/kg vs (volatile solids), while the fermentation gas yield converted to a yield attained by fermentation of the whole protein-removed juice and the whole pulp (i) reached 24.3 liters. The composition of the fermentation gas was 56% methane, 43.1% carbon dioxide, 0.06% hydrogen sulfide and 0.8% others.

EXAMPLES 2 to 14

Separations and extractions of starch and protein were conducted by use of potato in the same manner as in Example 1 by employing various kinds and amounts of alkali salts added and various conditions of heat treatment of juice. The results are shown in Table 1. In all the cases, white and high-quality starch and protein could be obtained in substantially the same yields.

Further, each protein-removed juice and each pulp fermentation came to an end within 4 days, and a fuel gas of good quality having a low hydrogen sulfide concentration could be recovered.

TABLE 1

| Example No. | Starting materials Kind | Solid content (%) | Organic substances (%) | Chemical agent added Kind | Amount added (g) | Crushed slurry Color | Yield (g) | Starch containing juice (a) Color | Yield (g) | Crude pulp (b) Color | Yield (g) |
|---|---|---|---|---|---|---|---|---|---|---|---|
| 1 | Potato | 25.0 | 22.0 | Na$_2$S$_2$O$_3$.5H$_2$O | 0.05 | Light yellowish white | 1000 | Light yellow | 660 | Light yellowish brown | 350 |
| 2 | " | " | " | " | 0.10 | " | " | " | 655 | " | 355 |
| 3 | " | " | " | " | 0.50 | " | " | " | 657 | " | 353 |
| 4 | " | " | " | " | 5.00 | " | 1005 | " | 654 | " | 354 |
| 5 | " | 25.3 | 22.1 | NaHSO$_3$ | 0.05 | " | 1000 | " | 665 | " | 345 |
| 6 | " | " | " | " | 0.10 | " | " | " | 662 | " | 353 |
| 7 | " | " | " | " | 5.00 | " | 1005 | " | " | " | 340 |
| 8 | " | 24.0 | " | Na$_2$SO$_3$ | 0.10 | " | 1000 | " | 655 | " | 355 |
| 9 | " | " | " | K$_2$SO$_3$ | " | " | " | " | " | " | 345 |
| 10 | " | " | " | K$_2$S$_2$O$_3$.H$_2$O | " | " | " | " | " | " | 353 |
| 11 | " | 25.1 | 22.0 | Na$_2$S$_2$O$_3$.5H$_2$O | 0.10 | Light yellowish white | 1000 | Light yellow | 658 | Light yellowish brown | 350 |
| 12 | " | 25.0 | " | " | " | " | " | " | 661 | " | 348 |
| 13 | " | " | " | " | " | " | " | " | 662 | " | 349 |
| 14 | " | 25.1 | " | Na$_2$S$_2$O$_3$.5H$_2$O NaHSO$_3$ | 0.05 0.05 | " | " | " | 659 | " | " |

| Starch removed juice (d) Color | Yield (g) | Heat treatment of a juice Temp. (°C.) | Time (min) | Dry powdered protein (e) Color | Odor | Protein content (%) | Yield (g) | Protein removed juice (f) Yield (g) | Dry starch (c) Color | Odor | Water content (%) | Yield (g) |
|---|---|---|---|---|---|---|---|---|---|---|---|---|
| Light yellow | 610 | 80 | 2 | White | A | 70 | 6.6 | 584 | Pure white | B | 18.0 | 180 |
| " | 608 | " | " | " | " | " | 6.7 | 582 | " | " | " | 181 |
| " | 610 | " | " | " | " | " | 6.6 | 583 | " | " | 18.1 | 180 |
| " | 607 | " | " | " | " | " | 6.8 | " | " | " | 18.0 | " |
| " | 612 | " | " | " | " | " | 6.6 | 580 | " | " | 17.5 | 177 |
| " | 605 | " | " | " | " | " | " | " | " | " | 18.0 | 175 |
| " | 609 | " | " | " | " | " | 6.7 | 582 | " | " | " | 182 |
| " | 610 | " | " | " | " | " | " | 580 | " | " | " | 177 |
| " | 611 | " | " | " | " | " | " | 583 | " | " | 20.0 | 180 |
| " | 609 | " | " | " | " | " | " | 581 | " | " | 18.0 | " |
| Light yellow | 605 | 55 | 2 | White | A | 70.1 | 6.7 | 583 | Pure white | B | 18.0 | 182 |
| " | 610 | 85 | 2 | " | " | 70 | " | 581 | " | " | " | 181 |
| " | 607 | 80 | 0.5 | " | " | 70.1 | 6.4 | 580 | " | " | 18.1 | 180 |
| " | 608 | " | 2 | " | " | 70 | 6.7 | 582 | " | " | " | 181 |

A: a faint odor of potato
B: a faint odor of starch were fermented in the same manner as in Example 1. The results are shown in Table 2. In all the cases, the

TABLE 2

| Example No. | Protein-removed juice (f) (g) | Crude pulp (d) (g) | Days of fermentation (days) | Metane yield (h) (l/kg vs) | Converted fermentation gas yield (i) (l) | Compositional ratio of (i) (%) CH$_4$ | CO$_2$ | H$_2$S | Others |
|---|---|---|---|---|---|---|---|---|---|
| 1 | 292 | 64 | 3 | 340 | 24.3 | 56.0 | 43.1 | 0.06 | 0.8 |
| 2 | 291 | " | " | 341 | 24.5 | 56.2 | 43.0 | 0.07 | " |
| 3 | 292 | 63 | " | 339 | 25.0 | 56.0 | " | 0.16 | " |
| 4 | 291 | " | 3.5 | 330 | 23.3 | 55.9 | 42.4 | 0.90 | " |
| 5 | 290 | 62 | 3 | 341 | 24.5 | 56.0 | 43.0 | 0.06 | " |
| 6 | " | 63 | " | " | 24.4 | 55.6 | 43.5 | " | " |
| 7 | 291 | " | 4 | 332 | 26.3 | 54.0 | 43.3 | 1.90 | " |
| 8 | 290 | 64 | 3 | 340 | 24.3 | 56.0 | 43.1 | 0.06 | " |
| 9 | " | " | " | 339 | 25.1 | 56.0 | 43.0 | 0.09 | " |
| 10 | 291 | " | " | 340 | 24.5 | 56.1 | 43.1 | 0.07 | " |
| 11 | 292 | " | " | 338 | 24.3 | 56.5 | 43.3 | " | 0.04 |
| 12 | 291 | " | " | 341 | 24.1 | 56.2 | 42.1 | 0.06 | 1.40 |
| 13 | 290 | 64 | " | 335 | 24.5 | 56.0 | 43.0 | 0.05 | 0.94 |
| 14 | 291 | 63 | " | 342 | 24.0 | 56.1 | " | 0.07 | 0.83 |

EXAMPLE 15

By molecular sieving, 607 g of a protein-removed juice (f) prepared in the same manner as in Example 9 was concentrated. It was then passed through a pressure filter equipped with a filter having a pore size of molecular weight 20,000 to be concentrated to a volume of 50 ml. The concentration procedure required 30 minutes.

To the concentrate was added 100 ml of water, and filtration was conducted again to remove low-molecular-weight substances. Then, 50 ml of the thus obtained light-yellow concentrate was dried so as to be formed into a thin film. This dried protein was crushed in a mortar to obtain 14 g (protein content: 47%) of protein powder which was light-yellow and had a slight odor of potato.

Next, 278 g of the filtrate of the aforesaid protein-removed juice and 63 g of pulp were mixed and then poured into a fermentor made of acrylic resin which had an effective volume of 2 liters and contained 1.5 kg of a seed culture slurry.

The mixture was fermented with batchwise under anaerobic condition (one phase digestion) at a fermentation temperature of 60° C. and a stirring rate of 100 r.p.m. As the seed culture slurry, there was used a fermented slurry prepared by repeating culture for an acclimatization twice by batchwise fermentation by using a starting slurry separately prepared by the same procedure as described above, except that no sodium thiosulfate was added at the time of crushing the subterranean stem.

The fermentation came to an end in 4.5 days, and the methane yield reached 310 liters/kg vs, while the fermentation gas yield converted to a yield attained by fermentation of the whole protein-removed juice and the whole pulp reached 20.1 liters. The composition of the fermentation gas was: 56% methane, 43.1% carbon dioxide, 0.08% hydrogen disulfide and 0.8% others. Thus, starch and protein of high quality could be obtained even when a method for separating protein was changed from the precipitation by heating in Examples 1 to 14 to molecular sieving.

EXAMPLE 16

To 1 kg of potato (solid content: 28.3%, in which 27.2% was accounted for by organic substances) was added 100 mg of sodium thiosulfate pentahydrate, and the potato was crushed to a grain size of 1 mm or less by means of a motor-driven mixer to obtain about 1 kg of a crushed slurry. No darkening discoloration occurred in the crushing procedure and the slurry assumed a light yellowish white color. The aforesaid crushed slurry was filtered by means of a centrifugal extractor to obtain 580 g of a light-yellow starch containing juice and 420 g of light-yellowish-brown pulp. The aforesaid starch-containing juice was centrifuged to separate white starch granules, whereby 534 g of a light-yellow juice (solid content: 7.0%, in which 6% was accounted for by organic substances) was obtained. Next, 1 kg of water was added to the aforesaid pulp to prepare a slurry, which was then sieved by use of a 40-mesh screen to wash out starch granules, and the residue was filtered by means of a centrifugal filter and then dehydrated by compressing to obtain 170 g of pulp (solid content: 25.3%, in which 24.1% was accounted for by organic substances).

On the other hand, to the starch granules separated from the aforesaid juice was added water 10 times volume as much as these starch granules, and the resulting mixture was allowed to stand to precipitate and separate the starch granules. The above-mentioned washing procedure was repeated once more, and the thus separated starch and the starch recovered from the pulp were combined and then compressed to be dehydrated. The starch dehydrated was dried by air stream at 70° C. to obtain 98 g (water content: 18%) of pure-white dry starch.

In an 1-liter stainless steel beaker was placed 534 g of the juice freed from starch by the procedures described above, and heated in a water bath at 80° C. for minutes. By the above-mentioned heat treatment, a palely cream-colored protein precipitate was formed. The precipitate was centrifuged to obtain 502 g of a protein-removed juice. On the other hand, 80 ml of water was added to the protein precipitated by the centrifugation to suspend the protein, after which centrifugation was conducted again to recover a protein precipitate. This protein precipitate was spread into a thin film and dried. The dried protein was crushed in a mortar to obtain 4.0 g (protein content: 70%) of protein powder which was whitish and had a slight odor of potato. Protein and starch of high quality could be recovered even when the kind of subterranean stem was changed.

COMPARATIVE EXAMPLE 1

By means of a motor-driven mixer, 1 kg of potato (solid content: 25%, in which 22% was accounted for by organic substances) was crushed to a grain size of 1 mm or less in the same batch as in Example 1 to obtain 1 kg of a crushed slurry. Darkening discoloration occurred in the crushing procedure and the slurry assumed a dark brown color. The aforesaid crushed slurry was filtered by means of a centrifugal extractor to obtain 654 g of a dark-brown starch-containing juice (a) and 356 g of brown crude pulp (b). The aforesaid starch-containing juice was centrifuged to separate light-brown starch granules, whereby 608 g of a dark-brown juice (solid content: 4.0%, in which 3.1% was accounted for by organic substances) was obtained. Next, 1 kg of water was added to the aforesaid pulp to prepare a slurry, which was then sieved by use of a 40-mesh screen to wash out starch granules, and the residue was filtered by means of a centrifugal filter and then compressed to obtain 125 g of washed and compressed pulp (d) (solid content: 25.2%, in which 24.1% was accounted for by organic substances). On the other hand, to the starch granules separated from the aforesaid juice was added water 10 times volume as much as these starch granules, and the resulting mixture was allowed to stand to precipitate and separate the starch granules. The above-mentioned washing procedure was repeated once more, and the thus separated starch and the starch recovered from the pulp were combined and then compressed. The starch dehydrated was dried by air stream at 70° C. There was obtained 180 g (water content: 18%) of dry starch (c) which was whitish though colored as compared with Examples of this invention.

In an 1-liter stainless steel beaker was placed 610 g of the juice (d) freed from starch by the procedures described above, and heated in a water bath at 80° C. for 2 minutes. By the above-mentioned heat treatment, a grayish-black protein precipitate was formed. The precipitate was centrifuged to obtain 575 g of a protein removed juice (f). On the other hand, 80 ml of water was added to the protein precipitated by the centrifugation to suspend the protein, after which centrifugation was conducted again to recover a protein precipitate. This protein precipitate was spread into a thin film and dried. The protein dried was crushed in a mortar to obtain 7.5 g (protein content: 64%) of nearly grayish-black, dry, powdered protein (e).

Next, 289 g of the aforesaid protein-removed juice (f) and 64 g of the pulp (d) were mixed and then poured into a fermentor made of acrylic resin which had an effective volume of 2 liters and contained 1.5 kg of a seed culture slurry. Subsequently, the mixture was fermented with batchwise on anaerobic condition (one phase digestion) at a fermentation temperature of 60° C. and a stirring rate of 100 r.p.m. As the seed culture slurry, there was used a fermented slurry prepared by repeating culture for an acclimatization twice by batchwise fermentation by using a starting slurry separately prepared by the same procedure as described above. The fermentation came to an end on the third day, and the methane yield (h) reached 340 liters/kg vs, while the fermentation gas yield converted to a yield attained by fermentation of the whole protein removed-juice and the whole pulp (i) reached 24.2 liters. The composition of the fermentation gas was: 55.0% methane, 44.1% carbon dioxide, 0.06% hydrogen disulfide and 0.8% others.

COMPARATIVE EXAMPLES 2 to 9

Separations and extractions of starch and protein were conducted by use of potato in the same manner as in Example 1 by employing various amounts of alkali salts added and various conditions of heat treatment of juice. The results are shown in Table 3. Further, the results of fermentation of each protein-removed juice and each pulp are shown in Table 4.

As is evident from the results of the above Examples and Comparative Examples, according to this invention, white and high-quality protein and starch can easily be recovered.

TABLE 3

| Comparative Example No. | Starting materials Kind | Solid content (%) | Organic substance (%) | Chemical agent added Kind | Adding amount (g) | Crushed slurry Color | Yield (g) | Starch-containing juice (a) Color | Yield (g) | Crude pulp (b) Color | Yield (g) |
|---|---|---|---|---|---|---|---|---|---|---|---|
| 1 | Potato | 25.0 | 22.0 | — | — | Dark brown | 1000 | Dark brown | 654 | Brown | 356 |
| 2 | " | " | " | $Na_2S_2O_3 \cdot 5H_2O$ | 0.005 | Brown | " | " | 655 | " | 355 |
| 3 | " | " | " | " | 10.0 | Light yellow | " | " | 664 | Light yellowish brown | 352 |
| 4 | " | 25.3 | 22.1 | $NaHSO_3$ | 0.005 | " | " | Brown | 661 | Brown | 339 |
| 5 | " | " | " | " | 10.0 | " | " | Light yellow | 664 | Light yellowish brown | 353 |
| 6 | " | 25.0 | 22.0 | Cysteine hydrochloride | 1.0 | Yellowish brown | " | Dark brown | 650 | " | 350 |
| 7 | " | " | " | $KHSO_3$ | 0.1 | Dark brown | " | " | 655 | Brown | 356 |
| 8 | " | " | 22.1 | $Na_2S_2O_3 \cdot 5H_2O$ | 0.1 | Light yellow | " | Light yellow | 658 | Light brown | 352 |
| 9 | " | " | " | " | " | " | " | " | 660 | " | 350 |

| Protein removed juice (d) Color | Yield (g) | Heat treatment of juice Temp. (°C.) | Time (min) | Dry powdered protein (e) Color | Odor | Protein content (%) | Yield (g) | Protein removed juice (f) Yield (g) | Dry starch (c) Color | Odor | Water content (%) | Yield (g) |
|---|---|---|---|---|---|---|---|---|---|---|---|---|
| Brown | 608 | 80 | 2 | Grayish black | A | 64 | 7.5 | 575 | Nearly white | B | 18.0 | 180 |
| " | 610 | " | " | Light gray | " | " | 7.4 | 573 | " | " | 17.9 | 182 |
| Brown | 613 | " | " | White | " | 71 | 6.5 | 586 | Pure white | " | 17.5 | 176 |
| Light yellow | 605 | " | " | Gray | " | 62 | 7.5 | 570 | Nearly white | " | 18.0 | 180 |
| Dark brown | 610 | " | " | Nearly white | " | 69 | 6.8 | 587 | Pure white | " | " | " |
| Brown | 610 | " | " | Grayish black | " | 63 | 7.4 | 573 | Nearly white | " | " | 183 |
| Brown | 609 | " | " | " | " | 63 | 7.4 | 575 | " | " | " | 181 |
| Light yellow | 609 | 50 | 10 | White | " | 44 | 1.8 | 590 | Pure white | " | " | " |
| " | 610 | 95 | 10 | Yellow | " | 60 | 8.0 | 581 | " | " | " | 180 |

A: a slight odor of potato
B: a slight odor of starch

TABLE 4

| Comparative Example No. | Protein removed juice (f) (g) | Crude pulp (d) (g) | Days of fermentation (days) | Methane yield (h) (l/kg vs) | Converted fermentation gas yield (i) | Compositional ratio of (i) (%) | | | |
|---|---|---|---|---|---|---|---|---|---|
| | | | | | | CH₄ | CO₂ | H₂S | Others |
| 1 | 289 | 64 | 3 | 340 | 24.2 | 55.0 | 44.1 | 0.06 | 0.8 |
| 2 | 287 | " | 3 | 339 | " | 56.0 | 43.1 | " | " |
| 3 | 293 | " | 18 | 151 | 13.5 | 45.0 | 51.0 | 3.20 | " |
| 4 | 285 | " | 3 | 338 | 24.1 | 56.0 | 43.1 | 0.06 | " |
| 5 | 294 | " | 18 | 123 | 11.0 | 41.0 | 50.1 | 4.2 | 0.7 |
| 6 | 290 | " | 3 | 340 | 24.4 | 56.0 | 43.1 | 0.08 | 0.8 |

What is claimed is:

1. In a process for recovering potato starch and protein by crushing a starch-containing potato and separating and recovering starch and protein from the resulting crushed slurry, the improvement which comprises crushing said potato in the presence of sodium thiosulfate, the amount of sodium thiosulfate added being 0.005 to 0.5 percent by weight on the wet-potato basis, the sodium thiosulfate being added to the potato at the crushing of the potato, to thereby avoid darkening of the recovered starch and protein.

2. A process for recovering potato starch and protein according to claim 1, which includes a step of separating the resulting crushed slurry into crude starch, pulp and a juice after the crushing.

3. A process for recovering potato starch and protein according to claim 2, wherein protein is separated from said juice.

4. A process for recovering potato starch and protein according to claim 3, wherein in separating protein from said juice, said juice is subjected to molecular sieving to separate said juice into a liquid protein concentrate and a protein removed juice.

5. A process for recovering potato starch and protein according to claim 3, wherein in separating protein from said juice, said juice is heat-treated to agglomerate protein, and the thus-formed protein agglomerate is separated from the resulting juice containing the protein agglomerate.

6. A process for recovering potato starch and protein according to claim 5, wherein the heat treatment is performed at 55° to 85° C. for 0.5 to 100 minutes.

* * * * *